United States Patent [19]

Berg

[11] 4,037,425
[45] July 26, 1977

[54] BUOYANCY APPARATUS

[75] Inventor: Harry Berg, Abbotsford, Canada

[73] Assignee: H. B. Contracting Ltd., Surrey, Canada

[21] Appl. No.: 584,838

[22] Filed: June 9, 1975

[51] Int. Cl.² .............................................. F16L 1/04
[52] U.S. Cl. ........................................ 61/112; 114/270
[58] Field of Search .................... 61/46.5, 72.3, 112, 61/97, 69; 9/8 R; 114/.5 R, .5 F

[56] References Cited

U.S. PATENT DOCUMENTS

| 3,633,369 | 1/1972 | Lawrence | 61/46.5 |
| 3,765,185 | 10/1973 | Peck et al. | 61/72.3 |

FOREIGN PATENT DOCUMENTS

| 647,739 | 10/1962 | Italy | 61/72.3 |
| 1,191,146 | 5/1970 | United Kingdom | 61/72.3 |

Primary Examiner—Paul R. Gilliam
Assistant Examiner—David H. Corbin
Attorney, Agent, or Firm—Larson, Taylor and Hinds

[57] ABSTRACT

A plurality of buoyancy tanks are connected at spaced intervals to a pipeline, each having an opening in the bottom thereof, a remotely-controlled pressure air line is connected to a normally closed water-controlled air inlet valve and an outlet valve of each tank which is closed by said air, and water entering the tank opening the inlet valve and then shutting off of the air pressure in the air line permitting the outlet valve to open.

26 Claims, 4 Drawing Figures

U.S. Patent
July 26, 1977
4,037,425
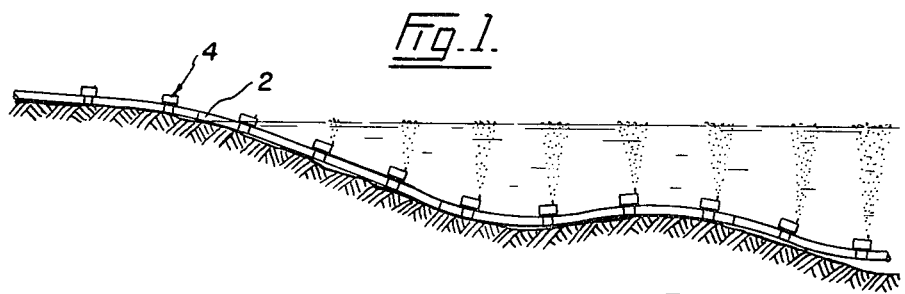
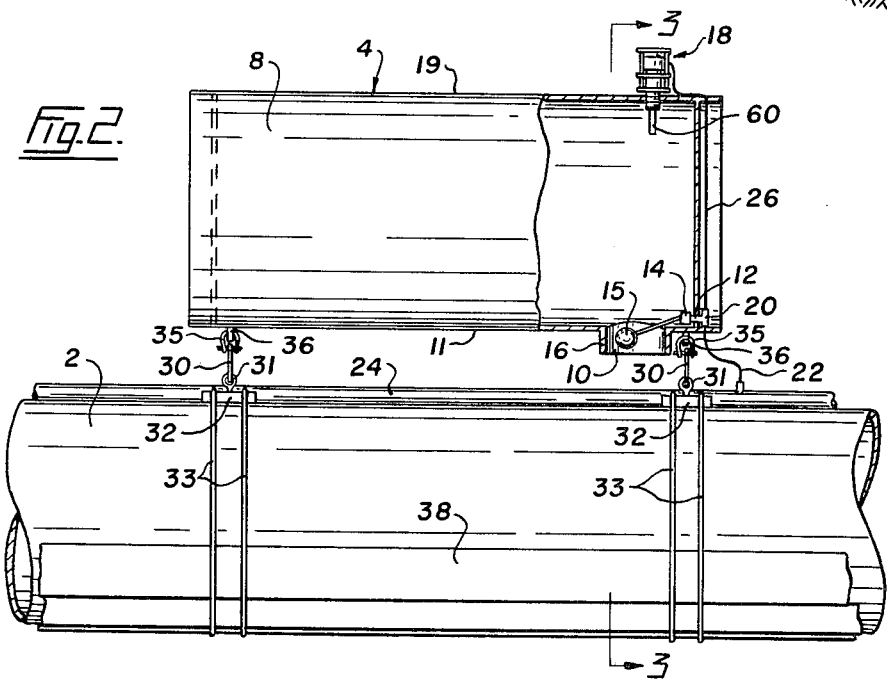
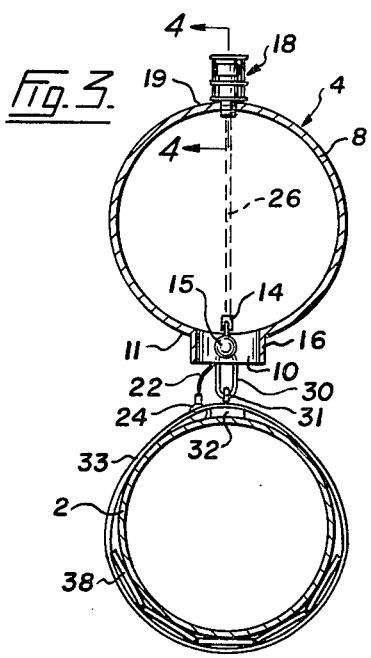
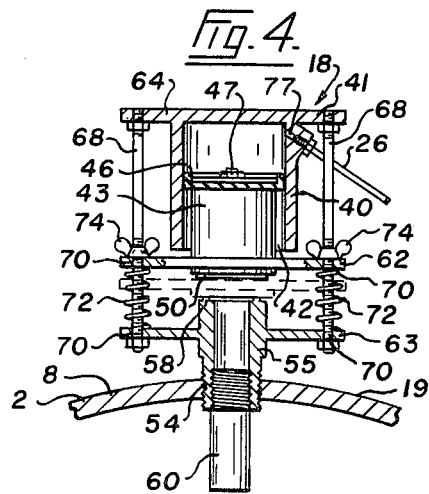

BUOYANCY APPARATUS

This invention relates to a buoyancy apparatus useful in the laying of underwater piping.

Submerged pipelines, particularly sewage outfalls are being used more and more frequently and in increasingly larger diameters and longer lengths. Lengths of over a mile and diameters of up to 60 inches are now common. Construction of these pipelines is generally carried out by assemblying the pipe on the shore in lengths determined by the space available. The assembly lengths are then pulled out along the ocean floor. The next section is then prepared, attached to the prior section and then the joined sections again pulled out along the ocean floor. This operation is repeated until the pipeline is complete and in place.

Construction of these pipelines may be carried out with or without buoyancy assistance. The most common method is the direct pull without buoyancy, but this requires tremendous power as it must allow for the weight of the total pipeline. Some recent pipelines have weights of up to 200 pounds per foot and a total submerged weight of over 400 tons. Although many installations have been completed using this method, there are certain disadvantages. One disadvantage results from the fact that all submerged pipelines are coated and/or lagged with lumber. As the pipes are extremely heavy the coating is susceptible to damage, particularly if dragged over rough terrain. A second disadvantage is that the large amount of power required for the pull can place heavy stresses on the pipe itself. Thirdly, once in place, re-positioning of the pipe can be extremely difficult due to its great weight. Fourthly, the powerful equipment, cables and support equipment is expensive.

To remove these disadvantages many pipes have been installed using the assitance of buoyancy vessels. These vessels are attached to the pipe and because of their buoyancy, lessen the load on the pulling equipment. Standard sealed vessels have proved satisfactory in shallow depths where there are no or weak cross-currents. However, when greater depths are encountered or when there are powerful cross-currents, a number of disadvantages appear. First, to decrease the pipe weight sufficiently for pulling can leave the pipe vulnerable to drifting in a cross-current when the pipe is at rest between pulls. For example, a 48 inch pipe complete with buoyancy vessels, at a submerged weight of 10 pounds per foot, can readily drift off line when exposed to a cross-current. Ideally the pipe should be at approximately 10 pounds per foot during the pull with an immediate increase to about 50 pounds per foot when the pull is completed. Further, when extreme depths are encountered, the bottom pressure requires the use of heavy reinforced vessels as the buoyancy vessels. This excessive weight can offset a large portion of the buoyancy and therefore a large number of vessels are required. The bottom pressure at a depth of 400 feet is approximately 170 pounds per square inch. There are other disadvantages. A leak in any vessel can result in a loss of buoyancy. Usually the vessels are made of steel and these are expensive, particularly the reinforced vessels required. Finally, the installation depth is limited by the strength of the vessels.

Further improvements have been used on certain installations in which medium weight vessels have been pressurized with air. This method relies upon a combination of mechanical strength and internal air pressure in the vessel to withstand underwater pressure. This can remove the need for heavy reinforced vessels, but the disadvantage of excessive buoyancy when the pipe is in a cross-current in between pulls and when at rest still exists. In addition, pressure vessels for expandible gases, usually air, require special inspection and official approval. They are therefore costly. A leak in a vessel can result in its total collapse. The vessel itself is then lost and, of course, the buoyancy provided by that vessel is also lost. As above, the installation depth is also limited by the strength of the vessel and also by the amount of internal pressure.

The present invention avoids the above disadvantages by providing a buoyancy vessel adapted to be connected to an air system when in use and including valve means through which the buoyancy of the vessel is automatically maintained as it submerges and as it rises in water. In the preferred form of the invention, the bouyancy vessel also includes valve means selectively operable to destroy or substantially destroy the buoyancy of the vessel, and means for restoring the buoyancy when desired.

When it is desired to move a pipeline into place in the water, a plurality of these vessels are secured thereto at spaced intervals. As each vessel has a predetermined buoyancy, the buoyancy imparted to the pipeline is regulated by the number or spacing of the buoyancy vessel. A calculated buoyancy is imparted to the pipeline. For example, the weight of the pipeline may be reduced to approximately 10 lbs per foot. As the buoyancy of the vessel is maintained as the pipeline is lowered or raised, it is not subject to any stresses at this time.

Some of the advantges obtained by this invention are:

1. The need for heavy pulling equipment is eliminated.
2. The amount and size of support equipment is reduced.
3. Protective coating damage is neglegable.
4. The pipeline is not subject to stresses when it is being lowered and raised in the water.
5. As the buoyancy vessels are not subject to any external or internal pressure regardless of the depth of the water, lightweight vessels such as fibreglass vessels, may be used.
6. Cost of each vessel is relatively low.
7. Each vessel provides maximum buoyancy without having to offset its own weight, as is the case with heavily reinforced steel vessels.
8. Lightweight buoyancy vessels may be flooded and taken down by a diver to be attached to the load and the air system. This is particularly advantageous when during installation it is found that extra vessels are required. The overall system can also be applied to salvage work in remote areas.
9. The vessels can have a minimum buoyancy so that they are readily salvaged when released from the load.
10. The load can be lowered and raised at any time without loss of buoyancy or endangering the buoyancy vessel due to water pressure variations.

The present invention not only contemplates the individual buoyancy vessels or tanks, but it also includes the overall buoyancy apparatus including a plurality of spaced-apart buoyancy tanks attached to a load, such as a pipeline, and a pressure gas or air line extending alone the load and connected to the tanks. When there is gas pressure in the line, there is gas available to maintain the buoyancy of the tanks as they move downwardly through the water, and to maintain means preventing gas from being discharged from the tanks. When the gas pressure is cut off, gas is allowed to emerge from the tanks so that water can enter them to reduce their buoyancy. At this time, there is no gas available for keeping the water out of the tank.

Buoyancy apparatus in accordance with this invention is adapted to be connected to a pressure gas line and comprises a tank, an opening in the tank, a gas inlet in the tank through which gas from said line can be directed into the tank, water level-controlled valve means controlling the gas inlet, said valve means normally being closed and being opened when water enters the tank through said opening to permit gas to enter the tank to expel the water, thereby maintaining the buoyancy of the tank.

In the preferred form of the invention, the tank has a gas outlet valve remote from the opening of the tank, this valve being operable remotely from the tank.

More specifically, the buoyancy apparatus of this invention is for a load, such as a pipeline, to be moved in a body of water, and comprises a plurality of buoyancy vessels connected to the load at spaced intervals to give the load a predetermined degree of buoyancy; each of said vessels comprising, a tank, an opening in the tank communicating with the interior near the bottom thereof, a gas inlet in the tank, water level-controlled valve means controlling the gas inlet, said valve means normally being closed and being opening when water enters the tank through said opening; a pressure gas line extending along the load and connected to the gas inlet of the tanks to direct gas into each tank when the valve means thereof is opened to expel water from said each tank, whereby as the tanks submerge, the water pressure increases and gas is directed into the tanks and as the tanks rise and the water pressure decreases the gas therein expands and flows out of the tank opening respectively to maintain the buoyancy of the tanks.

Preferred embodiments of this invention are illustrated in the accompanying drawings in which:

FIG. 1 illustrates a pipeline having a plurality of buoyancy vessels or tanks secured thereto in accordance with this invention, FIG. 2 is a side elevation, partly in section, of a portion of the pipeline with a buoyancy tank connected thereto, FIG. 3 is a vertical section taken on the line 3—3 of FIG. 2, and FIG. 4 is an enlarged sectional view on line 4—4 of FIG. 3.

FIG. 1 illustrates the laying of a pipeline 2 in accordance with the present invention and having a plurality of spaced buoyancy vessels or tanks 4 attached thereto.

Referring to FIGS. 2 and 3, a buoyancy vessel 4 according to the preferred aspect of the present invention comprises a tank 8 having an opening 10 therein near the bottom thereof. In this example, opening 10 is relatively large and is in the bottom 11 of the tank. There is a gas inlet 12 in the tank and this is opened and closed by suitable water level-controlled valve means, such as a float-controlled valve 14. Valve 14 is operated by a float 15 in or near opening 10. As water enters the tank 8, float 15 of valve 14 moves upwardly and thus operates the valve to open the gas inlet 12 to admit gas. Outlet 10 is provided with a shroud 16 projecting externally of the tank 8. This shroud surrounds the opening and projects downwardly from the tank. Float 15 is preferably located within the shroud, as shown.

There is a gas outlet valve 18 positioned in the tank 8 near the top thereof and remote from the opening 10. In this example, valve 18 is in the top 19 of the tank. The gas outlet valve 18 (or dumper valve as it can be referred to) is operable remotely from the tank. Valve 18 is shown in more detail in FIG. 4 discussed below.

Referring to FIG. 2, a take-off or T-fitting 20 is connected to tank inlet 12, and a line 22 connects this take-off or T-fitting to a compressed gas supply pipe 24 running the along pipe 2. Take-off or fitting 20 is also connected to a pipe 26 that is attached to the valve 18. The arrangement is such that pressure air in pipes 24, 22 and 26 keeps the outlet valve closed, and is available to direct air into tank 8 when float 15 rises to operate valve 14 to open inlet 12 below.

Each buoyancy tank 10 is secured to pipe 2 in any desired manner. In this example, each end of tank 8 is connected to the pipe by a short cable 30. This cable is in the form of a continuous loop, and extends at its lower end through an eye 31 of a D-clamp 32 which rests on the upper surface of pipe 2 and is secured thereon by straps 33 which extend around the pipe. The upper end of cable 30 is connected by a shackle 35 to a loop 36 secured to and projecting downwardly from the bottom of tank 8. The pipe 2 is usually provided with lagging 38 along its lower surface for protective purposes. In this case, straps 33 extend over the outer surface of this lagging.

Referring to FIG. 4, the outlet valve 18 comprises a cylinder 40 closed at one end by a wall 41 and having an opposite open end 42. A piston 43 is mounted for reciprocation within the cylinder and has a flexible seal or cup 46 secured to one end thereof by a bolt 47 in order to form a gas tight joint between the piston and the cylinder wall. A compressible sealing member 50 is mounted on the opposite end of a piston which projects through the open end 42 of the cylinder.

An outlet opening 54 is formed in the tank 8 near the top thereof, and in this example, the opening is formed in the top 19 of the tank. A pipe 55 is threaded in opening 54 and extends outwardly from the tank. This pipe is open at its outer end to form a valve seal 58 normally spaced from and in line with piston 43 so that when said piston is extended, the seal member 50 engages seat 58 to close pipe 55. This in effect closes opening 54 of the tank.

It is desirable to keep some air in tank 8 and this is accomplished by providing a dip tube 60 at outlet 54. In this example, dip tube 60 is threaded into the inner end of pipe 55. With this arrangement the amount of air retained in the tank can be adjusted by using dip tubes of different lengths.

Parallel flanges 62 and 63 are secured to an project laterally from the outer ends of piston 43 and pipe 55, respectively. A similar flange 64 is formed with the end wall 41 of the cylinder and projects outwardly therefrom and is substantially parallel with flanges 62 and 63. A plurality of rods or bolts 68 extend through flanges 63, 62 and 64 outside cylinder 40. These bolts are secured to flanges 63 and 64, but extend freely through holes 70 in flange 62. Spring 72 are mounted on some or all of the bolts 68 and are positioned between flanges 62 and 63, and wing nuts 74 fitted on these bolts above flange 62 can be turned to adjust the compression of these springs. These springs normally keep sealing member 50 of the piston clear of valve seat 58 so that tank 8 is normally open through pipe 55, but when piston 43 is extended, the springs are compressed and sealing member 50 closes off the outlet opening of the tank. Cylinder 40 has a gas inlet 77 adjacent its outer end near wall 41, this inlet being connected to pipe 26. When gas pressure is applied to pipe 26 it is also applied to the upper end of piston 43 to extend the latter to close the valve seat and the tank. When the gas pressure is cut off, springs 72 force the piston to retract to clear sealing member 50 from valve seal 58 and thereby open the tank.

Wing nuts 74 can be screwed downwardly on rods or bolts 68 to move piston 43 downwardly to lock sealing member 50 on valve seal 58 thereby rendering valve 18 inoperative and locking the tank closed so that it is not influenced by changes of gas pressure in pipe 26.

In use of the illustrated preferred embodiment, compressed air pipeline 24 is laid along the pipe 2. A plurality of buoyancy vessels 4 are connected to the pipe by means of cables 30 and the elements associated therewith. The number of vessels attached to any length of pipe can be determined by calculation, and depends upon the weight of the pipe and the buoyancy required.

When the buoyancy tanks 8 are in use and when their full buoyancy is in operation, that is, there is no water in the tanks, they carry a predetermined percentage of the weight of the pipeline. When the tanks are full or substantially full of water, they do not carry the pipeline. Each tank, when empty, has a certain degree of buoyancy, and so the number of tanks required and the spacing thereof can be calculated relative to the weight of the pipeline and the degree of buoyancy that is to be imparted to it.

As each of the tanks 8 function in the same manner, for the sake of convenience, the function of one only will now be described.

Pipe 24 is connected to pipes 22 and 26 and air pressure is applied to this pipe system from a compressor positioned on shore or in a boat to make pressure air available at tank inlet 12 and valve 14 and at outlet valve 18. Valve 18 is closed by the air entering the cylinder 40 through inlet 77 forcing the piston 43 outwardly so that seal member 50 engages seat 58 of pipe 55, thereby shutting the tank gas outlet 54. The pipeline 2 is pulled in the usual manner out into the water and along the bottom, as generally indicated in FIG. 1. At this time, the interior of each tank is in communication with the surrounding water through the tank opening 10. As the pipe and the attached buoyancy vessels are submerged, the water pressure increases and water is forced into each tank 8 through the opening 10 thereof. The presence of water in the tank raises float 14 to open the inlet valve 12. Compressed gas from pipe 24 then enters the tank to force out the water through opening 10 until float 14 falls into the position shown in FIG. 2, at which time valve 12 is closed. The buoyancy of tank 8 is thus maintained. This automatic emptying of water from the tank by the application of compressed gas through the inlet 12 continues as the pipe submerges further. In other words, the buoyancy of the tank is automatically maintained regardless of the increase in water pressure as the pipeline moves into greater depths in the water.

Although valve float 14 does not have to be located in shroud 16, it is preferably so located. The reason for this is that float valves are not always consistant or accurate and therefore, if the valve shuts off the water-expelling gas too soon, some water will be left in the tank or shroud. If left in the tank, the water would be from end to end thereof and so would be a relatively large amount. On the other hand, with the float positioned in the shroud, only a small amount of water would be left in the latter if the valve shuts off the air source sooner than it should. Thus, in the latter case, the buoyancy of the tank would be affected by variations in the operation of the float valve a great deal less when the float is in the shroud than when it is positioned in the tank.

When it is desired to reduce the buoyancy of pipe 2 gas pressure in line 24 is shut off at the shore or boat, and the pressure in the pipe system is relieved. Coil springs 72 in valve 18 then force the piston 43 off seat 58 to open tank 8 at the top thereof the allow gas to escape out of the tank under pressure of the water entering through opening 10 in the bottom of the tank. Float 14 floats upwardly at this time to open gas inlet 12 but there is no gas available because the gas has been cut off line 24. Thus tank 8 is permited to contain water and its buoyancy is reduced. It is desirable that the tank should never be allowed to fill completely with water in order to keep it upright. Dip tube 60 in the tank and projecting downwardly from the top thereof prevents the escape of all of the air. Thus, some buoyancy is left in the tank to keep it upright and, if desired, to keep cables 30 under a little tension to keep them from getting snarled.

When it is desired to restore the bouyancy of the tank, it is only necessary to reapply the pressure air to pipe 24 and thus to pipes 22 and 26. This closes valve 18 by moving piston 43 downwardly in cylinder 40 to engage seat 58 and close the tank outlet opening. As float valve 14 is held open at this time by float 15, compressed gas enters the tank 8 through inlet 12 to expel the water present in the tank.

Pipe 55 may be dispensed with so that piston 43 engages the external wall of tank 8 around the hole 54. However, the provision of the pipe 55 is preferred as it provides a convenient means of mounting dip tube 60 and, in particular, flange 63 to permit alignment of the components of the valve 18. It should be noted that the outlet valve 18 is not essential to the present invention in its broad aspect. However, it is desirable that all the tanks 8 be provided with the threaded hole 54 and thus be capable of being fitted with the valve 18. In this case, the hole would be closed by suitable means, such as by a plug threaded therein. If outlet valve 18 is present and is not required, it may be locked in the closed position by turning wing nuts 74 downwardly until the seal member 50 is locked in engagement with seat 58 of pipe 55, as shown in dotted lines in FIG. 4.

When the outlet valve 18 is locked closed or is not present, float 15 still controls the buoyancy of the tank. However, some air and buoyancy are maintained in the vessel even when the air pressure is relieved in the pipeline 24. These pipelines are usually pulled out intermittently to allow additional pipeline sections to be assembled and successively secured to the end of the pipeline in the water. In order to stop any drifting, of the pipeline during stops, it is desirable to decrease its buoyancy at these times. As it generally is not necessary to eliminate all of the buoyancy of the pipeline between pulls, only every third or fourth vessel, for example, need be provided with a functioning outlet valve 18. However, as long as opening 54 is present, any vessel may be changed to a dumping vessel either by releasing the wing nuts 74 when valve 18 has been locked closed, or by removing the plug and inserting a valve 18 into hole 54.

The buoyancy vessel according to the present invention, when in use, is not under any internal or external pressure regardless of depth because of the operation of inlet valve 14 controlled by float 15. There is always air or water in the tank at the same pressure at the surrounding water. This valve ensures that air pressure inside the tank 8 will change to equal the external water pressure provided that pipe 24 is connected to a sufficiently powerful compressor. As the water pressure increases so the air pressure increases in order to discharge the water from the tank. Therefore, tank 8 is not required to possess considerable mechanical strength. As a general rule, is it sufficient that is have sufficient mechanical strength to withstand its own buoyancy. Thus, the tank may be of relatively cheap material such as fibreglass. A 500-gallon fiberglass drum, which has proved useful as a tank, has a buoyancy of 5,000 pounds and it is, therefore, only necessary that the tank be sufficiently strong to stand this buoyancy.

The illustrated embodiment of the invention provides a number of other advantages. A leak in the vessel is not important. Although loss of compressed gas from within the tank 8 through a leak allows water to enter the tank 8, this water will lift float 14 to permit gas to enter through inlet 12. The water will then be expelled. There is no necessity for heavy pulling equipment. As the pull required is not high, pipe stresses are eliminated. The use of light weight vessels, for example made of fibreglass, is a considerable cost reduction. As the materials used can be light, each vessel provides maximum buoyancy for the pipe without having to offset its own weight. Furthermore, light weight vessels may be flooded, taken down by a diver and attached to the load and to the gas system. This is a particular advantage when, during installation of a pipeline, it is found that extra vessels are required. Furthermore, light weight vessels are readily salvaged when released, and, with a minimum built-in buoyancy, will surface under any conditions even when flooded. The tanks of the present invention permit lowering or raising of the load at any time without loss of buoyancy or endangering the buoyancy vessels 4 due to bottom pressure variation. The same vessels may be used to any depth. The only limiting factor is the air pressure available for application to pipe 24. The vessel may be released from any depth as the expanding air is safely expelled through opening 10, and provided that opening 10 is made sufficiently large, there is no danger of the vessel bursting with decrease in external pressure as the vessel rises through the water.

I claim:

1. Buoyancy apparatus comprising:
   a tank floatable in a body of water and adapted to be connected to a pressure gas line, said tank having gas therein and consequently having a predetermined buoyancy in the water,
   an opening in the tank near the bottom thereof to maintain the interior of the tank in communication with said water,
   a gas inlet in the tank spaced below the top of the tank and through which gas from said line can be directed into the tank,
   normally-closed valve means controlling the gas inlet and normally preventing gas from entering the tank, and
   control means connected to the valve means operable to open said valve means and located at said opening, said control means being operated by water flowing through the opening into the tank when the tank is moved downwardly in the water to open valve means and permit gas to enter the tank to expel the entering water, thereby maintaining the buoyancy of the tank.

2. Buoyancy apparatus as claimed in claim 1 in which said valve means comprises a normally-closed valve, and said control means comprises a float operatively connected to the valve, said float opening the valve when the float is raised by the water flowing through the opening into the tank.

3. A buoyancy vessel as claimed in claim 2 in which the opening in the tank is provided with a shroud projecting downwardly from the tank, and the valve float is located in the shroud.

4. A buoyancy vessel as claimed in claim 1 including means to attach the tank to a load.

5. A buoyancy vessel as claimed in claim 1 including
   a gas outlet in the tank remote from and above the level of said gas inlet,
   an outlet valve controlling the gas outlet, and
   operating means for the outlet valve and operable from a remote position selectively to close and open said outlet valve respectively to prevent and permit the escape of gas from the tank through said outlet.

6. Buoyancy apparatus as claimed in claim 5 in which said valve means comprises a normally-closed valve, and said control means comprises a float operatively connected to the valve, said float opening the valve when the float is raised by the water flowing through the opening into the tank.

7. A buoyancy vessel as claimed in claim 6 in which the opening in the tank is provided with a shroud projecting downwardly from the tank, and the valve float is loacted in the shroud.

8. A buoyancy vessel as claimed in claim 5 in which said operating means comprises,
   spring means normally biasing the outlet valve to an open position, and
   gas pressure operated means for selectively closing said outlet valve.

9. A buoyancy vessel as claimed in claim 8 including pipe means for connecting said pressure operated means to said pressure gas line.

10. A buoyancy vessel as claimed in claim 5 in which the gas outlet has a dip tube extending into the tank.

11. A buoyancy vessel as claimed in claim 5 in which said operating means comprises:
    a cylinder,
    a gas inlet adjacent one end of the cylinder,
    a piston reciprocable within the cylinder in substantially gas-tight manner, the piston being movable outwardly of the cylinder by application of gas through the cylinder inlet,
    said gas outlet being closable by the piston when the piston extends from the cylinder, and
    means urging the piston into the cylinder away from the outlet.

12. A buoyancy vessel as claimed in claim 11 in which the piston is formed with a sealing member to engage the gas outlet in the tank to close it.

13. A buoyancy vessel as claimed in claim 11 in which the tank has a pipe projecting outwardly from the gas outlet thereof, the end of the pipe remote from the tank forming a valve seat closable by movement outwardly of the piston.

14. A buoyancy vessel as claimed in claim 8 including a pipe for pressure gas connected to the gas inlet and the gas pressure operated means, said pipe having means to permit connection to a compressed gas supply line.

15. A buoyancy vessel as claimed in claim 11 comprising means operable to lock said piston in the position closing said gas outlet.

16. Buoyancy apparatus comprising:
   a tank floatable in a body of water and adapted to be connected to a pressure gas line, said tank having gas therein and consequently having a predetermined buoyancy in the water,
   an opening in the tank communicating with the interior near the bottom thereof to maintain said interior in communication with said water,
   a gas inlet in the tank spaced below the top thereof and through which gas from said line can be directed into the tank, and
   a normally-closed valve controlling the gas inlet and normally preventing gas from entering the tank, and
   a float located at said opening and operatively connected to the valve, said float on being raised by water flowing through the opening into the tank when the tank is moved downwardly in the water, opening the valve to permit gas to enter the tank to expel the entering water, thereby maintaining the buoyancy of the tank.

17. A buoyancy vessel as claimed in claim 16 including
   a gas outlet in the tank remote from and above the level of said gas inlet,
   an outlet valve controlling the gas outlet, and
   operating means for the outlet valve and connectable to said gas line, said operating means being operable by pressure in said line selectively to close and open said outlet valve respectively to prevent and permit the escape of gas from the tank through said outlet.

18. A buoyancy vessel as claimed in claim 17 in which said operating means normally retains said outlet valve closed when there is pressure in the line and being operated to open said outlet valve when there is no pressure in the line, whereby when the pressure gas is cut off from the line, the outlet valve is opened to permit gas to escape from the tank thereby allowing water to enter through said opening to lower the buoyancy of the tank.

19. Buoyancy apparatus as claimed in claim 17 including means for attaching said tank to a load.

20. Buoyancy apparatus as claimed in claim 17 in which said operating means comprises:
   a cylinder,
   a valve seat in communication with said gas outlet,
   a piston slidably mounted in the cylinder and movable between a retracted and an extended position, said piston when extended engaging the valve seat to close the latter,
   means normally retaining the piston in the retracted position leaving the valve seat open, and
   a gas inlet in the cylinder on the side of the piston remote from the valve seat and connectable to the gas line, whereby gas pressure in the gas line extends the piston to close the valve seat.

21. Buoyancy apparatus as claimed in claim 20 including a sealing member on the piston to engage said valve seat when the piston is extended.

22. Buoyancy apparatus as claimed in claim 20 in which said valve seat comprises a pipe in communication at one end with the interior of the tank and having an open opposite end facing the piston and engageable by the latter.

23. Buoyancy apparatus as claimed in claim 22 including a dip tube connected to said pipe and projecting downwardly in the tank to limit the amount of air that can escape therefrom when the valve seat is free of the piston.

24. Buoyancy apparatus as claimed in claim 17 in which said operating means comprises:
   a cylinder closed at one end and open at an opposite end,
   a piston slidably mounted in the cylinder and projecting from the open end thereof,
   a pipe aligned with and spaced from the open end of the cylinder, said pipe communicating at one end with the gas outlet and the interior of the tank and forming a valve seat at an opposite end,
   means normally biasing the piston away from the valve seat thereby leaving the tank open, and
   a gas inlet in the cylinder near the closed end thereof and connectable with the gas line, whereby gas pressure in the gas line moves the piston against the valve seat to close the tank.

25. Buoyancy apparatus for a pipeline to be moved in a body of water, comprising:
   a plurality of buoyancy vessels connected to the pipeline at spaced intervals to give the pipeline a predetermined degree of buoyancy;
   each of said vessels comprising:
   a tank having gas therein and consequently a predetermined buoyancy in the water,
   an opening in the tank communicating with the interior near the bottom thereof to maintain the interior in communication with said water,
   a gas inlet in the tank,
   normally-closed valve means controlling the gas inlet,
   control means connected to the valve means operable to open said valve means and located at said opening, said control means being operated by water flowing through the opening into the tank when the tank is moved downwardly in the water, to open the valve means;
   a pressure gas line extending along the pipeline and connected to the gas inlets of the tanks to direct gas into each tank when the valve means thereof is opened,
   whereby when the tanks submerge and the water pressure increases, the control means of the tanks open the respective valve means thereof to permit gas to enter the tanks to maintain the bouyancy thereof.

26. Buoyancy apparatus as claimed in claim 25 in which each tank includes
   a gas outlet in the tank near the top thereof,
   a normally-open outlet valve controlling said gas outlet, said outlet valve when open permitting gas to escape from the tank,
   operating means for the outlet valve operable under gas pressure to close said outlet valve,
   pipe means connecting said operating means to the gas line, said operating means closing the outlet valve when there is gas pressure in the line;
   whereby when the gas pressure of the gas line is cut off, the outlet valves open to permit gas to escape from the tanks thereby allowing water to enter the tanks through the openings thereof as there is no pressure gas in the gas lines at this time to expel the water from the tanks.

* * * * *